United States Patent [19]
Clarke

[11] 3,789,053
[45] Jan. 29, 1974

[54] OXAZOLIDINONE MODIFIED TRIGLYCIDYL ETHER OF TRIHYDROXY TRIPHENYL METHANE AND DERIVATIVES THEREOF

[75] Inventor: James A. Clarke, Lake Jackson, Tex.

[73] Assignee: The Dow Chemical Company, Midland, Mich.

[22] Filed: Aug. 19, 1971

[21] Appl. No.: 173,258

[52] U.S. Cl. ...... 260/47 EN, 117/161 ZB, 161/184, 260/37 EP, 260/47 EP, 260/47 EC, 260/53 EP, 260/307 A, 260/830 TW
[51] Int. Cl. ............................................ C08g 30/14

[58] Field of Search ........ 260/47 EC, 47 EP, 47 EN, 260/59, 79, 77.5, 2, 307 A, 53 EP

[56] References Cited
UNITED STATES PATENTS
3,334,110  4/1967  Schramm .................... 260/830 X Primary Examiner—William H. Short
Attorney, Agent, or Firm—Raymond B. Ledlie et al.

[57] ABSTRACT

Novel oxazolidinone modified triglycidyl ethers of trihydroxy triphenyl methane and derivatives thereof are prepared which are useful in molding and adhesive compositions.

3 Claims, No Drawings

OXAZOLIDINONE MODIFIED TRIGLYCIDYL ETHER OF TRIHYDROXY TRIPHENYL METHANE AND DERIVATIVES THEREOF

This invention relates to novel oxazolidinone modified triglycidyl ethers of trihydroxy triphenyl methane and derivatives thereof, and to thermosettable and cured compositions thereof.

Compositions prepared from epoxy resins which are solid at room temperature, such as those of this disclosure, are particularly desirable for use in such applications as molding resins, particularly for encapsulation of electrical components; for laminates; adhesives; powder coatings and the like.

It has now been discovered that oxazolidinone modified triglycidyl ether of trihydroxy triphenyl methane and derivatives thereof when cured to a thermoset condition exhibits excellent if not outstanding physical properties of one or more of the group of properties such as tensile strength, adhesion to metals, retention of strength and adhesion at elevated temperatures, and particularly high heat distortion values.

These physical properties make the oxazolidinone modified triglycidyl ether of trihydroxy triphenyl methane of the present invention particularly suitable for such applications as molding compositions, adhesives, encapsulating and laminating resins and the like where the end products are to be employed in elevated temperature environments. Such utility is found in areas such as, for example, encapsulation of electrical components for aerospace applications, laminates for electronic printed circuit boards operating at elevated temperature, and the like.

The triglycidyl ethers of trihydroxy triphenyl methane and derivatives thereof which are modified to produce the novel compositions of the present invention may be represented by the following general formula:

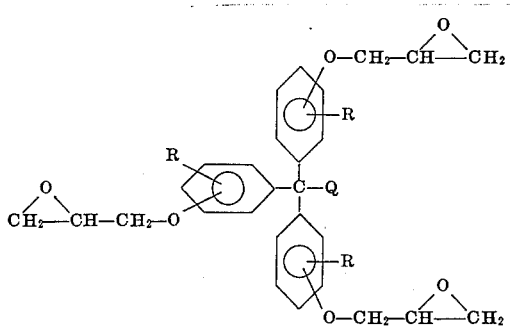

wherein Q is hydrogen or a lower alkyl group of from one to about two carbon atoms; R is hydrogen or a lower alkoxy group of from one to about four carbon atoms.

Procedures for preparing the triglycidyl ethers of trihydroxytriphenyl methane and derivatives thereof are fully described in a copending application by Paul E. Schrader entitled LEUCAURIN EXPOXIDES, Ser. No. 173,259, filed on Aug. 19, 1971 and in a copending application entitled EPOXIDES OF ALKOXY-SUBSTITUTED TRI(HYDROXYPHENYL)ALKANES by Raymond W. Mah, Ser. No. 173,257, filed on Aug. 19, 1971.

The expoxides of this invention, hereinafter generally designated as leucaurin epoxides, correspond to the formula

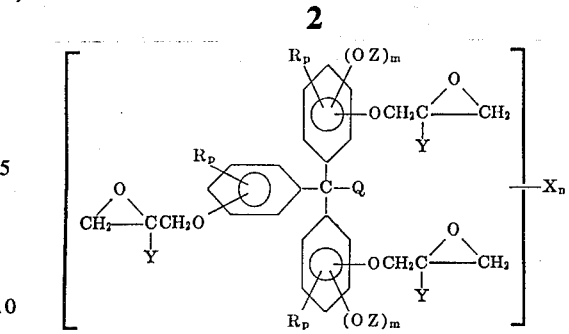

wherein Q is H or an alkyl of up to about 10 carbon atoms; each R is independently an alkyl group of up to about 12 carbon atoms, phenyl or a cycloalkyl group of from three to about six carbon atoms; each Y is independently H or —$CH_3$, each Z is independently H or

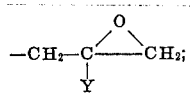

X is Cl, Br or $NO_2$; each $m$ is independently 0 to 1; each $p$ is independently 0 to 2; and $n$ is 0 to 6.

The epoxides of the instant invention are prepared by a process as follows:

1. A leucaurin-type phenolic compound, corresponding to the above formula (when the epoxypropoxy and $(OZ)_m$ groups are replaced by $(OH)_{m'}$, where $m'$ is 1 or 2, on the phenol-derived phenyls, and OH on the aldehyde- or ketone-derived phenyl), is combined in a suitable vessel with at least about 5 moles per OH equivalent, preferably about 10 moles per equivalent, of an epihalohydrin. The reaction is carried out in the presence of a coupling catalyst, such as benzyltrimethylammonium chloride, the reactants being heated to a temperature of from about 60° to 150°C., preferably reflux, for at least about 30 min., preferably about one hour.

2. At the end of said period, the mixture is cooled to about 35° to 70°C. and at least about one equivalent of caustic is added per hydroxyl equivalent. That reaction mixture is then stirred for from about 0.5 to 3 hours.

The resulting epoxidation reaction product has an average epoxide functionality of from at least about 2.5 to about 5, or at least 70% of theoretical for the number of available hydroxyls on the starting tri-phenolic, whichever is greater. Further, the product is primarily epoxidation product and contains no more than small amounts of resinous by-products, as evidenced by an Epoxidation Efficiency Rating of from about 23 to 81 for the reaction products of this invention. Expoxidation Efficiency Rating is defined as being the ratio of product epoxy equivalent weight/average epoxide functionality. For this rating, epoxy equivalent weight is calculated from the epoxy-substituted aromatic nucleus only (i.e., where $p$ and $n$ are O and Q is H in the above formula). This Rating, then, is a manner for assessing the (1) efficiency of converting hydroxyls to epoxy moieties, and (2) limiting by-product formation. The products, then, are viscous liquids or solids at room temperature, and very fluid at about 50°C.

The oxazolidinone modified triglycidyl ether of trihydroxy triphenyl methane may be prepared by any of several methods as described in the literature.

One method of preparation of the novel oxazolidinone-modified triglycidyl ether of trihydroxy triphenyl methane and derivatives thereof of the present invention is to react the triglycidyl ether of trihydroxy triphenyl methane or a derivative thereof with an organic polyisocyanate or polyisothiocyanate in the presence of a catalyst wherein the ratio of NCO or NCS groups to

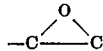

groups is in the range of from about 0.1:1 to about 0.5:1 and preferably from about 0.12:1 to about 0.30:1. When the NCO or NCS to

ratio exceeds about 0.5:1, the products have a tendency to gel.

Suitable catalysts for such reaction include trialkyl amines, alkali metal halides and quaternary ammonium and quaternary phosphonium compounds. In addition, co-catalysts such as a primary or secondary monohydric alcohol having from about one to about six carbon atoms may be employed to facilitate the reaction.

A further and frequently preferred method for the preparation of oxazolidinone-modified triglycidyl ether of trihydroxytriphenyl methane or derivatives thereof is to prepare a carbamate by the reaction of an organic diisocyanate with a monohydric alcohol and then to react the resultant carbamate compound with the triglycidylether of trihydroxy triphenyl methane or derivative thereof in the presence of the trialkyl amine, alkali metal halide, quaternary ammonium compound or phosphonium compound as a catalyst. The preparation of the carbamate may take place in the presence of the triglycidylether of trihydroxy triphenyl methane or derivative thereof which serves as a reaction medium for this reaction. If this technique is employed, the addition of the catalyst to the reaction medium after the formation of the carbamate will produce a reaction between the carbamate and the triglycidyl ether to produce the oxazolidinone-modified resin of this invention.

This preferred method is more fully described in my copending application, Ser. No. 48,524 filed June 18, 1970.

Suitable organic polyisocyanates and polyisothiocyanates which may be employed include diisocyanates and diisothiocyanates, such as, for example, toluene-2,4-diisocyanate; 1,5-naphthalene-diisocyanate; cumene-2,4-diisocyanate; 4-methoxy-1,3-phenylene-diisocyanate: 4-chloro-1,3-phenylenediisocyanate; 4-bromo-1,3-phenylenediisocyanate; 4-bromo-1,3 phenylenediisocyanate; 4-ethoxy-1,3-phenylenediisocyanate; 2,4'-diisocyanatodiphenylether; 5,6-dimethyl-1,3-phenylenediisocyanate; 2,4-dimethyl-1,3-phenylenediisocyanate; 4,4'-diisocyanatodiphenylether; benzidinediisocyanate; 4,6-dimethyl-1,3-phenylenediisocyanate; 9,10-anthracenediisocyanate; 4,4'-diisocyanatodibenzyl; 3,3'-dimethyl-4,4'-diisocyanatodiphenylmethane; 2,6'-dimethyl-4,4'-diisocyanatodiphenyl; 2,4-diisocyanatostilbene; 3,3'-dimethyl-4,4'-diisocyanatodiphenyl; 3,3'-dimethoxy-4,4'-diisocyanatodiphenyl; 1,4-anthracenediisocyanate; 2,5-fluorenediisocyanate; 1,8-naphthalenediisocyanate; and 2,6-diisocyanatobenzfuran.

Other suitable isocyanates include the diisocyanates as are described in Canadian Patent No. 700,026 and in U.S. Pat. No. 2,683,730; the phenyl indane diisocyanates which are described in U.S. Pat. No. 2,855,385, the organic diisocyanates which are described in U.S. Pat. No. 2,292,443.

Also included as useful in preparing the oxazolidinones of this invention are the isothiocyanates which are the sulfur analogs of the above mentioned isocyanates.

Polymeric isocyanates such as for example the polymethylene polyphenyl isocyanates may also be employed in the present invention.

The novel oxazolidinone-modified glycidyl ethers of trihydroxy triphenyl methane and derivatives thereof of the present invention may be represented by the general formula

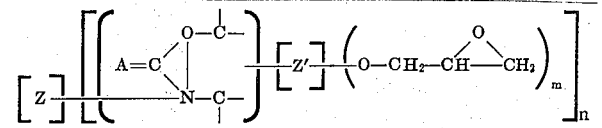

wherein Z is a polyvalent radical of the organic polyisocyanate or organic polyisothiocyanate, Z' is a polyvalent radical of the triglycidylether of trihydroxy triphenyl methane or derivative thereof, A is oxygen or sulfur and m has an average value of about 2, n has an average value of from about 2 to about 4 and wherein the unfilled valences in the oxazolidinone ring are hydrogen.

Since the ratio of NCO or NCS groups to

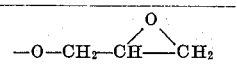

groups employed in the reaction to prepare the novel oxazolidinone-modified resin of the present invention is about 0.5 or less, and the

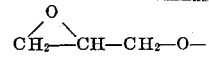

groups react in a random manner, it is possible for some molecules of the triglycidyl ether of trihydroxy triphenyl methane resin or derivative thereof employed to escape reaction with an isocyanate or isothiocyanate group. Thus, the resultant composition may contain minor amounts of unmodified triglycidyl ether of trihydroxy triphenyl methane or derivative thereof.

In formulating adhesives and molding compositions from epoxy resins in general and also from the oxazolidinone-modified triglycidyl ether of trihydroxy triphenyl methane or derivative thereof of the present invention, the active ingredients are the polyglycidyl ether and the curing agents therefor. In some instances, it is desirable to add other epoxy resins to the adhesive or molding formulation to provide a change in certain properties, such as viscosity, reaction rate, wetability of the surfaces to be bonded, and the like. When such mixtures are employed in connection with the present invention, the active ingredients then become a mixture of the oxazolidinone-modified epoxy resin, the added epoxy resin and the epoxy curing agent. In addition to the above mentioned active ingredients, adhesive compositions usually contain one or more additives such as fillers, accelerators, thixotroping agents and the like. Molding compositions usually also contain a mold release agent.

Suitable curing agents for the resin of the present invention include dicyandiamide, melamine, guanidines such as acetyl guanidine, methylene dianiline, m-phenylenediamine, $BF_3$ complex with monoethyl amine, anhydrides such as tetrahydrophthalic anhydride, dianhydrides such as benzophenone-tetracarboxylic dianhydride, and the like.

In the preparation of adhesives and molding compositions from epoxy resins, it is often desired to incorporate therein certain inert fillers. Suitable fillers which may be employed in the compositions of the present invention include, for example, aluminum powder, other metal powders, clays, inorganic carbonates, carbon black, silica flour and the like.

In formulating adhesives and molding compositions from epoxy resins, it is often desired to add compounds to the formulation which will reduce the cure time of the resin. Suitable accelerators which may be employed in the compositions of the present invention include, for example, tertiary amines such as benzyldimethylamine, dihydroxydiphenolics, substituted guanidines, $BF_3$ complex with monoethylamine and the like.

In some instances, it is desirable to employ thixotroping agents in adhesive and molding compositions. Suitable thixotroping agents which may be employed in the compositions of the present invention include, for example, silica aerogels, treated clays, fibrous mineral products such as asbestos or microcrystalline silicates and the like.

The following examples are illustrative of the present invention and are not to be construed as limiting the scope thereof in any manner.

EXAMPLE 1

To a reaction vessel fitted with agitator, thermometer, and means for applying vacuum and purging with nitrogen gas, was added 200 grams (1.270 epoxide equivalents) of the triglycidyl ether of 4,4'4" trihydroxy triphenylmethane. After degassing the resin under vacuum at 115°C, the vacuum was released using nitrogen. After cooling the resin to 60°C, 6.8 grams of methanol was added followed by the addition of 15.68 grams (0.180 NCO equivalents) of toluene diisocyanate (80/20 mixture by weight of the 2,4- and 2,6- isomers). The temperature was raised to 85°C and after 1½ hours, the toluene diisocyanate had reacted with the methanol to form the corresponding carbamate as noted by the disappearance of isocyanate groups by infrared analysis. The temperature was then raised to 145°C, and 100 mg. (500 ppm) of tetrabutylphosphonium bromide was added. The temperature was maintained at 155°C for 3 hours. The temperature was then raised to 185°C for 1 hour. The resultant product had an epoxide content of 20.3% and a Durran's softening point of 70°C. Infrared analysis indicated the presence of the desired oxazolidinone groups.

Tensile test specimens were prepared from this product by adding a stoichiometric amount of a hardener, 4,4'-methylene-bis(2-chloroaniline), to the melted resin at 140°C, then pouring the mixture into a one-eighth inch × 4 inch × 6 inch cavity and curing for 4 hours at 180°C plus 16 hours at 150°C. A tensile strength value of 6,000 psi with an elongation of 3% was obtained. The unmodified resin which is the triglycidyl ether of 4,4', 4"-trihydroxy triphenylmethane without oxazolidinone groups, cured with the same hardener in the same manner, gave an average tensile strength of 3,000 psi and 1% ultimate elongation. Thus, some of the brittleness associated with highly cross-linked epoxy resins has been eliminated by the oxazolidinone modification.

A molding composition was then formulated according to the following recipe.

60 grams of the product prepared above
14.05 grams methylene dianiline
48.0 grams ASP 400 clay filler
2.4 grams zinc stearate
1.2 grams resorcinol The heat distortion temperature of specimens of the above formulation cured at 300°F for 4 minutes was 390°F and when post cured at 200°C for 16 hours, the heat distortion temperature was 437°F. The above formulation had a spiral flow value of >105 inches when tested at 300°F and 250 psi for 3 minutes employing the procedure described on pages 104-108 of MODERN PLASTICS, February, 1968.

The product prepared above was evaluated as a high temperature adhesive by preparing the following formulation A:

| | |
|---|---|
| Oxazolidinone modified epoxy resin | 10 grams |
| Melamine | 0.2 grams |
| Dicyandiamide | 0.8 grams |
| Aluminum powder, −150 mesh | 8.0 grams |
| Silica aerogel | 0.25 grams |

A corresponding formulation B was prepared using the unmodified triglycidyl ether of 4,4',4"-trihydroxy triphenylmethane. In this case, 1.0 grams of dicyandiamide was used to allow for the higher epoxide content of the unmodified resin.

Lap shear samples were prepared in accordance with ASTM test D-1002. The samples were cured for 45 minutes at 360°F. These were tested at room and elevated temperatures. Each sample was held at the desired temperature for 6 minutes before testing. The results of the tests were as follows:

| Test Temperature | A | B |
|---|---|---|
| Room (77°F) | 2550 psi | 2120 psi |
| 300°F | 2160 | 1860 |
| 350 | 2900 | 2000 |
| 400 | 2460 | 1800 |
| 450 | 2080 | 1800 |
| 500°F | 1080 | 1530 |
| | 2205 psi av. | 1850 psi av. |

EXAMPLE 2

A. Preparation of Triglycidylether of Vanillin (3-Methoxy-4-Hydroxybenzaldehyde)Phenol Reaction Product Seventy-six grams (0.5 moles) vanillin and 705 grams (7.5 moles) phenol were mixed and melted at 40°C. 20 Grams 36% HCl (2.83% phenol wt.) was added and reacted 2 hours at 40°C. Excess phenol was flashed to 175°C under full vacuum to yield 150 grams of product. Theoretical yield was 161 grams.

One-hundred-seven grams (1 eq.) of the above product was dissolved in 462.5 grams (5 moles) epi. 1 Gram 60% aqueous BTMAC was added and reacted 1½ hours at 115°C. This was cooled to 25°C and dehydrochlorinated with 333 grams 15% caustic-carbonate for 1½ hours. The spent caustic was separated and the organic layer treated again with 333 grams caustic-carbonate for one-half hour. The spent caustic was separated and the organic layer was water washed until neutral. The lights were vacuum distilled to 150°C. This yielded 103 grams of product designated as (2–A) containing 25.1% epoxides. Theoretical yield was 163 grams and a softening point of about 50°C. Theoretical % of epoxide was 26.38.

B. Preparation of Oxazolidinone Modified Product of A

Forty grams of the above prepared product was placed in a flask equipped with means for stirring, nitrogen purge, and measuring and controlling the temperature. The resin was heated to 120°C, degassed, and the vacuum replaced by a nitrogen pad.

2.74 Grams of tolylene dimethyl urethane was added, pulus 6 drops of 70% alcoholic solution of tetrabutylphosphonium acetate acetic acid complex in methanol. The temperature was raised to 154°C over a period of 2.7 hours with a vacuum applied for the latter 1.7 hours to remove methanol evolved by the reaction. Analysis at this point indicated that all the urethane added had been reacted and that most of this had been converted to oxazolidinone by reaction with epoxide. About 8–10% of the urethane added was converted to isocyanate trimer. The product, designated as (2–B), at this stage was a dark red, solid resin with a Durran softening point of 68°C. Epoxide analysis gave a valve of 20.1% compared to a calculated value of 21.6% if the desired reaction alone took place.

Thirty grams of the above prepared product was cured with a stoichiometric amount, 6.95 grams, of methylene dianiline for 16 hours at 125°C and 2 hours at 175°C to give a one-half inch × one-half inch × 5 inch test bar. The heat distortion temperature of this bar was 416°F. Other data for this same cure were: 8,500 psi flexural strength and $4.6 \times 10^5$ psi flexural modulus.

EXAMPLE 3

A. Preparation of Triglycidyl Ether of Guaiacol (Orthomethoxyphenol)-Ortho-Hydroxybenzaldehyde Reaction Product Seventy grams (0.574 moles) o-hydroxybenzaldehyde, 500 grams (4.03 moles) guaiacol, and 150 mls glacial acetic acid were mixed and cooled to 10°C. A mixture of 70 mls $H_2SO_4$ and 110 mls glacial acetic acid was added and reacted for 2 hours at 10°–15°C. This was left to stand overnight at 25°C and then water washed twice, aqueous $NaHCO_3$ washed twice, and water washed twice. Excess guaiacol was vacuum distilled to 160°C. 160 Grams of dark, solid novolac was recovered. Theoretical yield was 203 grams.

One-hundred twenty-five grams (1.07 eq.) novolac was dissolved in 990 grams (10.7 moles) epi. 1.25 Grams 60% aqueous BTMAC was added and reacted for 2 hours at 110°C. This was cooled and dehydrochlorinated with 357 grams 15% caustic-carbonate as in 2–A above. The resin solution was water washed and vacuum distilled to 145°C. 165 Grams of product (3–A) containing 22.5% epoxides and having a Durran softening point of about 63°C was recovered. The theoretical yield was 185 grams and the theoretical % epoxide was 24.85.

B. Preparation of Oxazolidinone Modified Product of A

Eighty grams of the triepoxide was reacted with 7.47 grams of tolylene dimethyl urethane in the same manner as for example 2–B.

Total reaction time was 4½ hours at an average reaction temperature of 155°C.

The product analyzed 15.7% epoxide vs a calculated value of 16.5% if the desired reaction were complete with no side reaction.

Values for this product, cured with a stoichiometric amount of methylene dianiline at 125°C for 16 hours and 175°C for 2 hours are:

| Heat Distortion Temp. | 390°F |
| Flexural Strength | 5500 psi |
| Flexural Modulus | $4.5 \times 10^5$ psi |

EXAMPLE 4

Preparation and Testing of Adhesives

Adhesives were prepared from the products of Example 1, 2–A, 2–B and the triglycidylether of trihydroxy triphenylmethane (TGETHTPM) employing the following formulation:

100 parts by weight of resin
70 parts by weight of aluminum powder
4 parts by weight of colloidal silica
8 parts by weight of dicyandiamide
2 parts by weight of melamine The above components were well mixed at about 110°C and after degassing under vacuum at 100°C lap shear specimens were prepared by applying the adhesive to etched aluminum substrates preheated to 110°C and after curing at 360°F for 40 minutes, the specimens were cooled and lap shear values determined at various temperatures. The results are reported in the following table. The values given are in lb/in².

| | PRODUCT TESTED | | | |
| --- | --- | --- | --- | --- |
| Test Temp. (°F) | Ex. 2B | Ex. 2A | Ex. 1 | TGETHTPM |
| Room temp. (76) | 2300 | 1990 | 2090 | 1760 |
| 250 | 2180 | 1760 | 2680 | 2600 |
| 300 | 2130 | 1910 | 2700 | 2470 |
| 350 | 2500 | 1890 | 3070 | 2270 |
| 390 | 2030 | 1530 | 2920 | 1970 |
| 420 | 1440 | 1280 | 2860 | 1700 |
| 450 | 1590 | N.D.* | 2470 | 1770 |
| 480 | 1100 | N.D. | 2060 | N.D. |

*N.D.=not determined

EXAMPLE 5

To a 1,000 ml reaction vessel fitted with agitator, thermometer, means for controlled heating and means for applying vacuum and purging with nitrogen gas, was added 100 grams (0.652 epoxide equivalents) of the triglycidyl ether of 4,4'-4''-tri-hydroxy triphenylmethane which analyzed 28% epoxide. This resin is a semi solid which will flow when heated to about 60°C. After degassing the resin under vacuum at 95°C, the vacuum was released using nitrogen.

An isocyanate, which was primarily trifunctional, known as PAPI (polymethylene polyphenylisocyanate)

produced by the Upjohn Company, having an isocyanate equivalent weight of 133.5, and a functionality of about 2.7 and which is a dark colored liquid of moderate viscosity was reacted with excess methanol to convert the liquid to the solid tricarbamate. This product was dried free of the excess methanol and pulverized. Initially, 12.0 grams (.0725 eq.) of the PAPI-methanol adduct was added to the 100 g of resin in the flask and the temperature raised to 135°C to dissolve the adduct. Then 0.13 grams of tetrabutylphosphonium acetate acetic acid complex was added to catalyze reaction between the carbamate and epoxide. The temperature was then raised to 165°C. Infrared analysis was used to check the progress of the reaction, namely conversion of carbamate to oxazolidinone. After 2 hours at 165°C, including three-fourth hours under vacuum to remove the liberated methanol, the conversion was essentially complete but the product resin still was too soft to give a powderable solid at room temperature. Therefore, 2.0 grams of additional PAPI-methanol adduct was added and the reaction continued at 165°C for 2 hours longer. The product resin was an opaque brownish solid at room temperature. The epoxide content was analyzed as 20.4% epoxide vs. a calculated value of 21.9% from the ratio of isocyanate to epoxide which was 0.130. The Durran softening point of the solid was 80°C which is sufficient to allow flaking or pulverizing.

Heat distortion temperature of the resin cured with a stoichiometric amount of methylene dianiline was 419°F.

What is claimed is:
1. A thermosettable composition comprising
  1. an oxazolidinone modified triglycidyl ether of trihydroxy triphenyl methane represented by the general formula

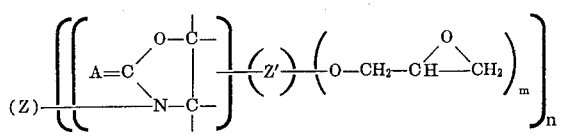

wherein Z is a polyvalent radical of an organic polyisocyanate or polyisothiocyanate, Z' is a polyvalent radical of antriglycidyl ether represented by the general formula

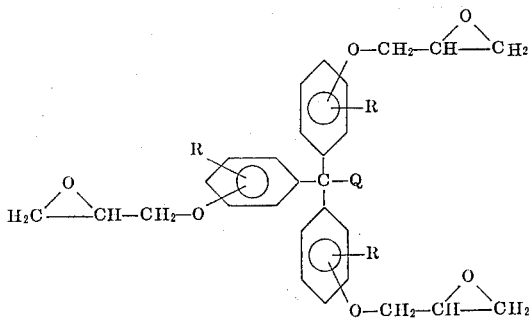

wherein Q is hydrogen or a lower alkyl group of from one to about two carbon atoms, R is hydrogen or a lower alkoxy group of from one to about four carbon atoms; A is oxygen or sulfur, $m$ has an average value of about 2, $n$ has an average value of from about 2 to about 4 and wherein the unfilled valences in the oxazolidinone ring are hydrogen, and
  2. a curing amount of a curing agent therefor.
2. The composition of claim 1 wherein the curing agent is methylene dianiline.
3. The composition of claim 1 wherein the curing agent is dicyandiamide.

* * * * *

UNITED STATES PATENT OFFICE
CERTIFICATE OF CORRECTION

Patent No. 3,789,053          Dated January 29, 1974

Inventor(s) James A. Clarke

It is certified that error appears in the above-identified patent and that said Letters Patent are hereby corrected as shown below:

Col. 1, line 59, change "EXPOXIDES" to --EPOXIDES--.

Col. 1, line 65, change "expoxides" to --epoxides--.

Col. 2, line 52 change "Expoxida-" to --Epoxida- --.

Col. 3, lines 51-53 delete one occurrance of "4-bromo-1,3-phenylenediisocyanate".

Col. 4, lines 18-24, change the formula between the "[ ]"

to read -- 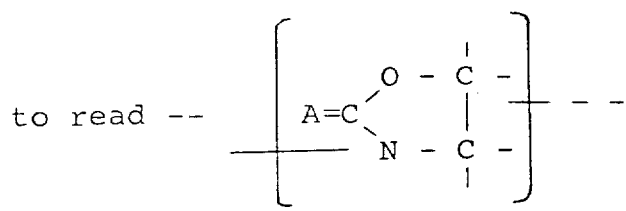

Col. 7, line 21, change "pulus" to --plus--.

Col. 10, line 8, change "antriglycidyl" to --a triglycidyl--.

Signed and Sealed this thirtieth Day of March 1976

[SEAL]

Attest:

RUTH C. MASON
Attesting Officer

C. MARSHALL DANN
Commissioner of Patents and Trademarks